United States Patent [19]

Wesner

[11] 4,409,639

[45] Oct. 11, 1983

[54] SOLENOID DRIVER CIRCUIT

[75] Inventor: Charles R. Wesner, Crozet, Va.

[73] Assignee: Sperry Corporation, New York, N.Y.

[21] Appl. No.: 306,445

[22] Filed: Sep. 28, 1981

[51] Int. Cl.³ .............................................. H01H 47/18
[52] U.S. Cl. ................................... 361/167; 361/191; 361/196; 307/597
[58] Field of Search ................. 361/22, 196, 197, 167, 361/191; 307/597, 598, 603; 318/588

[56] References Cited

U.S. PATENT DOCUMENTS 3,619,668 11/1971 Pinckaers .......................... 361/22 X
3,919,961 11/1975 McDougal ...................... 318/588 X
3,950,657 4/1976 Sheng et al. .................... 307/597 X
4,142,375 3/1979 Abe et al. ......................... 361/22 X

*Primary Examiner*—Reinhard J. Eisenzopf
*Attorney, Agent, or Firm*—Howard P. Terry

[57] ABSTRACT

A control circuit for driving solenoids protects these devices from failure due to overheating caused by frequent on-off cycling. Control signals are passed through logic gates. A timer responds to the termination of a control pulse and disables the logic gate that passes signals to the load for a predetermined time, thus restricting the minimum off time of the solenoid. Minimum on time or maximum on or off times are not affected.

4 Claims, 1 Drawing Figure

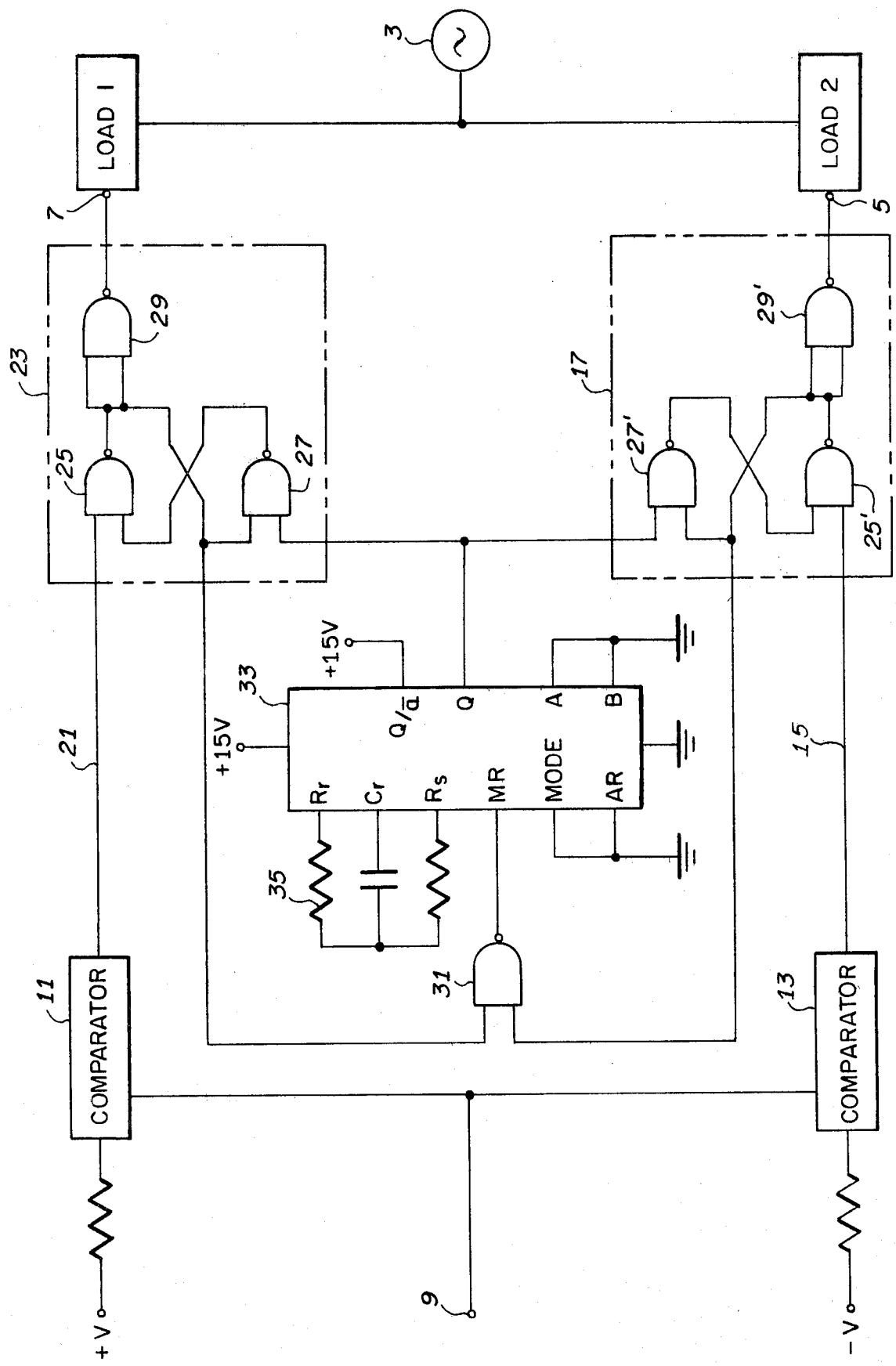

SOLENOID DRIVER CIRCUIT

BACKGROUND OF THE INVENTION

1. Field of the Invention

The invention relates to protective circuits and more specifically to circuits for protecting solenoids and other inductive devices from accidental overload due to rapid on-off cycling.

2. Description of the Prior Art

When an AC-powered solenoid is energized, a sudden in-rush of electrical current occurs which may typically be in the order of five times the normal holding current. In applications where the solenoid may be accidentally subjected to rapid on-off cycling, the resultant high RMS value of the driving current may be sufficient to cause overheating and failure of the solenoid. In a typical application, a pair of solenoids may be used to control hydraulic flow in a ship's steering system. Under certain weather and sea conditions, frequent correction of the ship's rudder angle may be required to maintain the ship on its desired course. Such maneuvers are accomplished by frequent on-off cycling of the solenoids and the consequent danger of system failure.

In the past, prevention of solenoid overload in marine steering systems has depended upon the skill of the helmsman in the case of manual steering systems or in permitting the rudder to deviate through sufficiently wide angles to reduce the frequency of on-off operations in automatic steering systems. In general, protection of solenoids has depended upon reducing the frequency of both on and off times. The present invention limits the minimum off time of solenoid operation without restricting the on time.

SUMMARY OF THE INVENTION

Overheating of an inductive load such as a solenoid caused by accidental high frequency on-off cycling is prevented by providing a drive circuit that limits the minimum off time of the solenoid. Analog command signals are applied to means for producing the control signal whenever the analog signal exceeds a predetermined threshold value. The control signal is applied to the load through gating means. Timing means disable the gating means for a predetermined time after the termination of a control signal.

BRIEF DESCRIPTION OF THE DRAWING

The sole FIGURE is a block diagram useful in explaining the operation of the invention.

DESCRIPTION OF THE PREFERRED EMBODIMENT

The FIGURE illustrates a particular application of the invention to a dual channel hydraulic marine steering system in which the "Load 1" and "Load 2" blocks represent a pair of solenoids energized from a power source 3. Loads 1 and 2 include power switching means for switching the power from the source 3 to the individual solenoids in response to control signals appearing at output terminals 5 and 7 of the driving circuit. The solenoids in Loads 1 and 2 regulate the flow of hydraulic fluid in the steering system to control port and starboard rudder deflections, respectively.

A DC analog command signal is supplied to the input terminal 9. Typically, such command signals would have a range of plus to minus 10 volts. The command signals are applied to voltage comparators 11 and 13 which are biased to positive and negative threshold levels respectively.

A command signal exceeding the negative threshold produces a high level control signal at the output of the comparator 13 in the lower channel of the driver circuit. This control signal is coupled through the line 15 to a first gating means 17. Conversely, a command signal which exceeds the positive threshold produces a high level output at the comparator 11 in the upper channel and this control signal is passed through the line 21 to the gating means 23. In either case, a high level signal applied to the gating means 17 or 23 serves to actuate the solenoid in the respective load. When the command signal lies between the two threshold values, a low level control signal appears at the output terminals 5 and 7 and neither solenoid is energized.

The gating means 23 includes a signal gating NAND gate 25, an enabling NAND gate 27, and an inverting NAND gate 29. The gating means 17 is identical to the gating means 23 so that a description of the structure and operation of gating means 23 applies also to gating means 17.

The outputs of the NAND gate 25 and the output of its conterpart 25 are applied to the input terminals of the timer NAND gate 31 whose output, in turn, is applied to the reset terminal of a timing module 33.

The timing module 33 consists essentially of a fixed frequency oscillator driving a counter which produces an output signal after accumulating a specified count, and which can be reset by the application of an external reset signal.

It has been found convenient to employ commercially available integrated circuit chips such as a Motorola catalog number 14541 integrated circuit chip for the timing module, and such a chip has been indicated in the accompanying FIGURE for convenience in describing the invention. Such chips can be "programmed" by applying appropriate voltages to various terminals on the chip and by selecting an appropriate resistor-capacitor combination 35 to provide a circuit that will yield a desired time interval.

Circuits of the type depicted in the FIGURE have been constructed with the electrodes on the timing module programmed as shown. With this configuration, the counter is started when the reset signal reaches a low level. The Q output with this configuration falls to a low level at the termination of the timing interval.

Consider now the operation of the circuit when the command signal lies between the two threshold values so that neither solenoid is to be actuated. Low level control signals will be applied to the signal gating means 25 and its counterpart 25' in gating means 17. Further assume this status has existed long enough for timing module 33 to have timed out. In this timed out state, the timing module produces a low level output signal at its terminal Q. This low level signal is applied to input terminals on the enabling gates 27 and 27', resulting in a high output voltage from each of these gates thus enabling the signal gating NAND gates 25 and 25'. Under these conditions, a command signal which exceeds the positive or negative threshold will produce a high level control signal which can be passed through the gating means 23 or 17 so as to permit the solenoid in the Load 1 or Load 2, respectively, to be energized.

Assume now, that the command signal exceeds the positive threshold voltage so that the solenoid in Load 1 is energized. Under these conditions, the output of NAND gate 25 in gating means 23 will be at a low value. This low level voltage is applied to the NAND gate 31 thus raising the output voltage from this gate to a high level which resets the counter, preparing it for the counting mode. During the reset mode, the Q output of the timing module is at a high level but this does not cause the output of the enabling gate 27 to drop to a low level because gate 25 output is still low. However, when the command signal drops below the positive threshold value, the output from the comparator 11 switches to a low value causing the output of the NAND gate 25 to rise to a high level. This permits gate 27 output to go low, which locks gate 25 output high and starts the timer by removing the reset level. Thus the load is prevented from being re-energized during the timing mode of the timing module 33. At the termination of the timing mode, the Q output voltage from the timing module drops to a low value so that the NAND gate 25 is again enabled, thus permitting control signals to be passed to the Load 1, and permitting the solenoid in that load to be energized in response to a command signal that exceeds the positive threshold value.

Since the circuits driving Load 1 and Load 2 are symmetrical, the foregoing description applies equally to the circuit driving Load 2 with the exception that the circuit driving Load 2 responds to command signals exceeding the negative rather than the positive threshold value.

Although a particular integrated circuit chip has been described for use as a timing module, it will be appreciated that this integrated circuit consists essentially of a fixed frequency oscillator and a counter. It will be apparent to those skilled in the art that numerous timer configurations could be used for this purpose.

Similarly, although a particular configuration of NAND gate has been described for the gating means, those skilled in the art will realize that various configurations of logic elements may be used to perform the same function as the described gating means.

Furthermore, although the invention has been described with respect to a particular dual channel marine application, it will be appreciated that the principles of the invention may be utilized in a wide variety of applications wherein a solenoid may be subjected to an inordinately high rate of on-off cycling. Although the particular application depicted in the FIGURE is used to drive first and second loads, it will also be appreciated that the illustrated circuit is symmetrical and the principles of the invention can be applied to a single channel wherein only a single load is to be actuated.

In addition, it should be noted that the invention is intended to limit adverse effects caused by the initial in-rush of current occurring when a load such as a solenoid is turned on. Obviously the principles of the invention may be applied to driving circuits for various types of inductive loads wherein such a phenomenon occurs.

While the invention has been described in its preferred embodiments, it is to be understood that the words that have been used are words of description rather than of limitation and that changes within the purview of the appended claims may be made without departing from the true scope and spirit of the invention in its broader aspects.

I claim:

1. A driver circuit for energizing a solenoid in response to analog input signals, said circuit comprising input terminal means for receiving said analog input signals, comparator means coupled to said input terminal means for producing a high constant value control signal whenever the input signal exceeds a predetermined threshold value, output terminal means for coupling the control signal to a load, gating circuit means for coupling said control signals to said output terminal means, and timing means for disabling said gating circuit means for a predetermined time interval after the termination of a high level control signal, said gating circuit means including signal gating means through which the control signal is coupled to the output terminal means, and enabling gating means for enabling and disabling said signal gating means in response to the output of said timing means.

2. The driver circuit of claim 1 further characterized in that said timing means includes a resettable counter driven by a constant frequency oscillator, said timer further including means to initiate a timing mode in response to a reset signal, and means to provide a first output voltage when the timer is in the timing mode and a second output voltage when the timer is in the timed out state, said driver circuit further including means to provide a reset signal to said timer in response to the termination of a control signal and means to disable said gating means during the occurrence of a first output voltage from said timer.

3. A driver circuit for selectively actuating either one of a pair of inductive loads in response to analog input signals, said driver circuit including first and second channels for actuating the first and second of said loads respectively, comparator means for applying a constant value control signal to said first channel whenever an input signal exceeds a positive threshold and to said second channel whenever an input signal exceeds a negative threshold, each of said channels further including gating means for coupling a control signal to the respective load, said driver circuit further including a timing means for disabling a gating means for a predetermined length of time after the termination of a control signal in that gating means.

4. The driver circuit of claim 3 in which the gating means in each channel includes a signal gating NAND gate through which control signals are coupled to the respective load and an enabling NAND gate for enabling and disabling the signal gating NAND gate in response to signals from said timing means, said timing means having reset means coupled to receive output signals from the signal gating NAND gates in each channel and being arranged to initiate a timing mode in response to the termination of a control signal from either of said signal gating NAND gates, said timing means further having output means coupled to both of said enabling NAND gates and arranged to provide an output signal that actuates said enabling NAND gates so as to disable both signal gating NAND gates during the occurrence of a timing mode.

* * * * *